United States Patent [19]

Hackenjos

[11] 4,203,935

[45] May 20, 1980

[54] FILTER MEDIA

[75] Inventor: Ernst Hackenjos, Munich, Fed. Rep. of Germany

[73] Assignee: Rolf Jaeger, Costa Mesa, Calif.

[21] Appl. No.: 923,003

[22] Filed: Jul. 10, 1978

[30] Foreign Application Priority Data

Aug. 31, 1977 [DE] Fed. Rep. of Germany ....... 2739236

[51] Int. Cl.² .............................................. B01F 3/04
[52] U.S. Cl. .......................................... 261/98; 55/90; 55/522; 261/DIG. 72
[58] Field of Search .................................. 261/94–98, 261/79 A, 111, 112, DIG. 72; 210/150, 151; 55/90–92, 522, 529

[56] References Cited

U.S. PATENT DOCUMENTS

| | | | |
|---|---|---|---|
| 1,848,576 | 3/1932 | Sandel | 261/DIG. 72 |
| 2,882,996 | 4/1959 | Lanier et al. | 261/111 X |
| 3,645,510 | 2/1972 | Klugman | 261/94 |
| 3,752,453 | 8/1973 | Doyne | 261/94 |
| 3,791,634 | 2/1974 | Phelps | 261/111 |
| 3,874,858 | 4/1975 | Klugman et al. | 261/98 X |
| 3,958,958 | 5/1976 | Klugman et al. | 261/98 X |
| 4,133,851 | 1/1979 | Ovard | 261/111 |

FOREIGN PATENT DOCUMENTS

45591 5/1966 Fed. Rep. of Germany ... 261/DIG. 72
2313287 9/1974 Fed. Rep. of Germany ... 261/DIG. 72

*Primary Examiner*—Richard L. Chiesa
*Attorney, Agent, or Firm*—Price, Heneveld, Huizenga & Cooper

[57] ABSTRACT

A filter media for scrubbers includes a plurality of spherical bodies made of a liquid wettable material shaped in a latticework jacket having a great circular ring from which extend arcuate bars terminating near the poles of the spherical body so formed. Spaced axially extending bars extend from the arcuate bars and terminate within the body at free ends. The arcuate bars have a cross section which tapers inwardly toward the center of the body to provide maximum capture of liquid droplets.

18 Claims, 11 Drawing Figures

FILTER MEDIA

BACKGROUND OF THE INVENTION

The invention relates to a filter body for scrubbers for separation of contaminated liquid from gases.

In filter bodies, it is necessary not only to finely distribute the flow of liquid trickling or flowing over it, but also to bring the interior of the plurality of the fine liquid currents, threads of liquid and liquid drops, which traverse through the accumulation of the filter body, to the surface, so that the liquid be constantly whirled over. Should the filter bodies be used, for example, for separating solid or liquid phases from gas currents, it is equally important that as many as possible wetted baffles or drops extend against which the impurities can strike and that, notwithstanding, the total throughflow resistance of the filter body arrangement remains slight.

Known filter bodies such as German laid-open patent application No. 23 13 287 were conceived so as to unite an optimal scattering and distribution of a current of liquid wandering through a packing tower filter body with an optimal whirling of the current of gas streaming through the bed of the filter bodies with an optimal shedding. The latticework of the known bars forming the filter body are of a rectangular cross section or of a quadratic cross section and are conducted so that a drop flowing along on a bar reaches a transverse edge as soon as possible where it must unite, divide, or drip off.

SUMMARY OF THE INVENTION

The present invention improves the filter body so that the current of liquid will be further refined, especially its ability of passing over edges meaning the undesirable phenomenon whereby a part of the exchange liquid does not run any more in the tower through the bed of the filter body but runs along the inner wall of the tower in the form of a film of a thickness that increases downwardly so that the efficiency of the exchange of this part of the liquid becomes very bad.

The improved results of the present invention are obtained by forming the arcuate bar portion of the latticework filter bodies with an inwardly tapered cross section. In the upper half of the filter body sphere in which part of the liquid tends to run outward along the bars of the jacket, this portion runs against it along the inner edges of the bars until it drips off or reaches a bar of the lower half of the sphere that directs the liquid toward the bottom of the sphere. The liquid is thus kept to an optimal extent, far from the tower wall.

In order to make a filter body that unites these advantages and yet is easily producible, it is designed so that the arcuate bars of the jacket are displaced sidewise on one hemisphere with respect to the other hemisphere, so that preferably two arcuate bars always are located approximately opposite each other on different hemispheres adjacent from different sides, vertical to one another on the separating plane of the surface of both hemispheres. In that the filter body is not provided with inwardly extending projections, these extend expediently vertically to the mentioned separating plane from the lattice bars into the inside of the sphere.

The preferred possibility for the fabrication of filter bodies according to the invention is the production by pressure or die casting process, according to whether the filter body is made of metal or, as it is preferred, of plastic. The design of the filter body according to the invention allows manufacturing with a two part die casting or pressure cast mold without intersections, since the bars located on one half of the sphere of the latticework are always displaced relative to the bars placed on the other half of the sphere.

The filter body according to the invention is advantageously spherical. Deviations are natually possible as long as these do not deviate from the spherical shape, so far that the favorable pouring attitude is not too limited by the elimination of forming wide interspaces. A preferred form of embodiment of the filter body according to the invention is surrounded by an annular meridian bar proceeding along a great circle and is adjacent from the outside to the surface of the sphere on which the other arcuate bars of the lattice jacket of the filter body apply from the inside. The great circular ring has a cross section that also tapers inwardly toward the inside of the sphere.

The lattice bars proceed preferably in circular arches. This permits a simple design. For this purpose, it is also possible to double bend the lattice bars so that they run along the surface of the sphere in a zig-zag pattern. This, however, is relatively expensive, but is optimal relative to its technical effect. Nevertheless, it suffices often to have straight bars, i.e., bars proceeding along the great circles on the surfaces of the sphere.

The surface upon which the approximately oppositely placed bars are adjacent is, therefore, preferably plane.

The design is especially favorable when the great circular ring proceeds in or on the separating plane.

Even if a meridian shaped projection of the lattice shaped bars from the great circular ring is preferred, the lattice bars can extend also, for example, on planes proceeding in parallel to each other, vertical on the separating plane and parallel to each other.

The bars reaching into the inside of the filter body must not run exclusively vertically to the separating plane. There can also be bars arranged transversely to this plane. Furthermore, there can equally be additional bars proceeding on or near to the surface of the sphere and connecting bars which project from the great circular ring.

The rods extending from the great circular ring in the invention are arranged so that they proceed from the projections extending along the edges from the spherical space, basically filled, alternately from the one and the other half of the diecast mold made of two parts where the separating plane of the mold lies in the great circular ring. The above mentioned, additional bars extend near to the spherical surface, should then run so that they are formed from the recesses on the free faces of the mentioned projections of the mold.

Always two adjacent lattice bars of a hemisphere join, preferably in the case of vertically extending lattice bars, from the mentioned great circular ring at a distance in front of the spot of the greatest distance from the separating plane to a pair of bars wherein such pairs of bars extend alternately on the one and the other side of the separating plane, so that pairs of bars, adjacent relative to the median of the separating plane are adjacent from different sides on a common standard plane to the separating plane. In this design, bars extend preferably from the points of connection of adjacent lattice bars vertically to the center plane. These bars can meet from both sides within the area of the center plane and form there, for example, a ring. However, these bars preferably end in the area in front of the mentioned separating plane or center plane. The cross section of these bars lie within the outline of the projection of both joining bars on the separating plane. In the preferred design, the point of connection of the pairs of bars are preferably connected on one side of the great circular ring. This is very advantageous, especially when the meridian bars are not supported on one side of the great circular ring by the respective suppporting bars on meridian bars on the other side of the great circular ring.

The invention is explained in detail with reference to the following description on the preferred form embodiments.

DETAILED DESCRIPTION OF THE PREFERRED EMBODIMENTS

Figure 1:
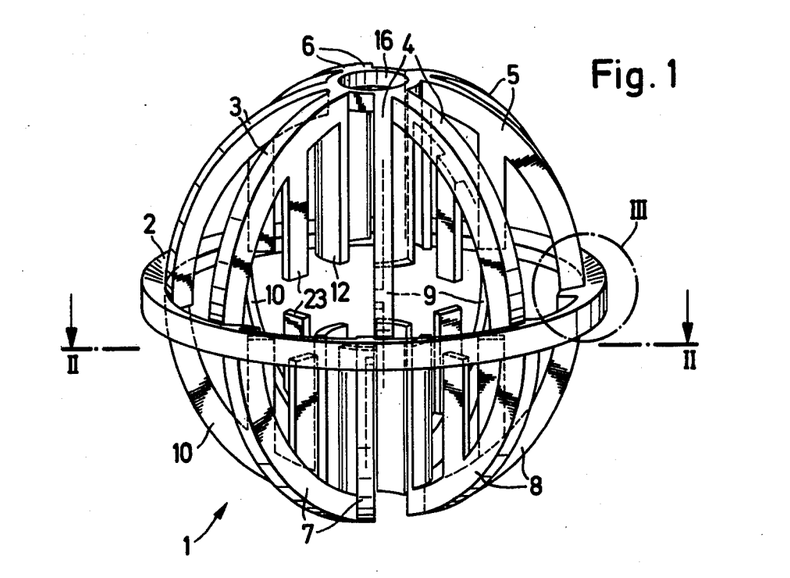
FIG. 1 is a perspective view of the preferred form of embodiment of a spherical filter body according to the invention, extending with the mentioned separating plane in the drawing plane.
Figure 2:
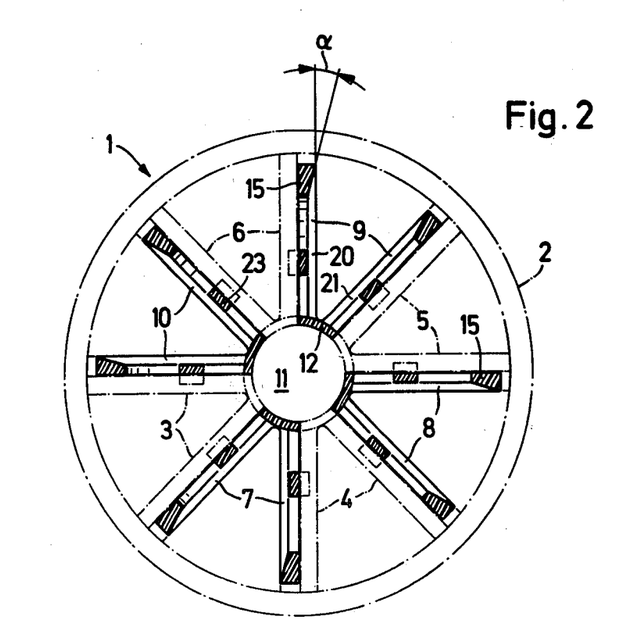
FIG. 2 is a cross section II—II of FIG. 1 in parallel with the great circular ring.
Figure 3:
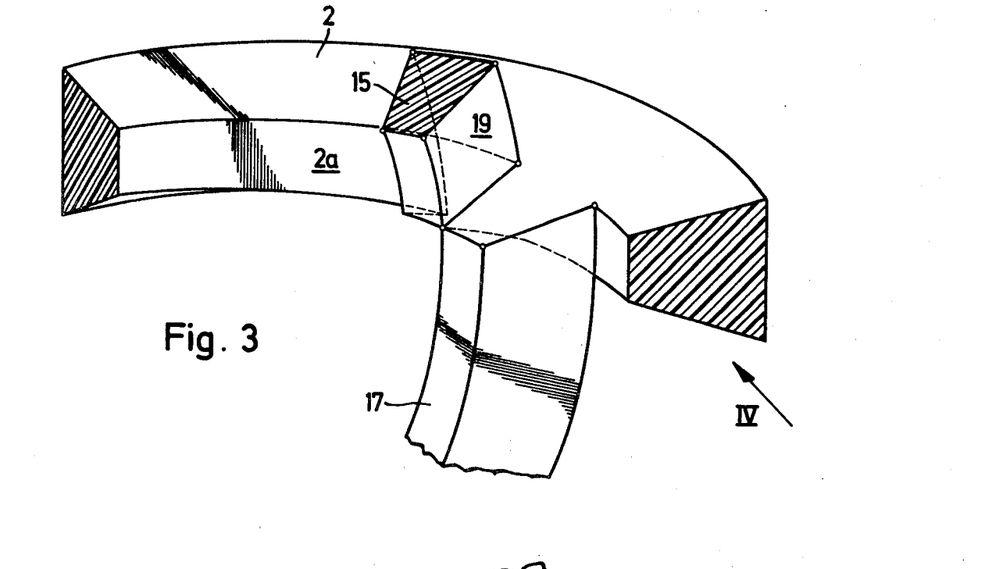
FIG. 3 is a greatly enlarged detail III of FIG. 1.
Figure 4:
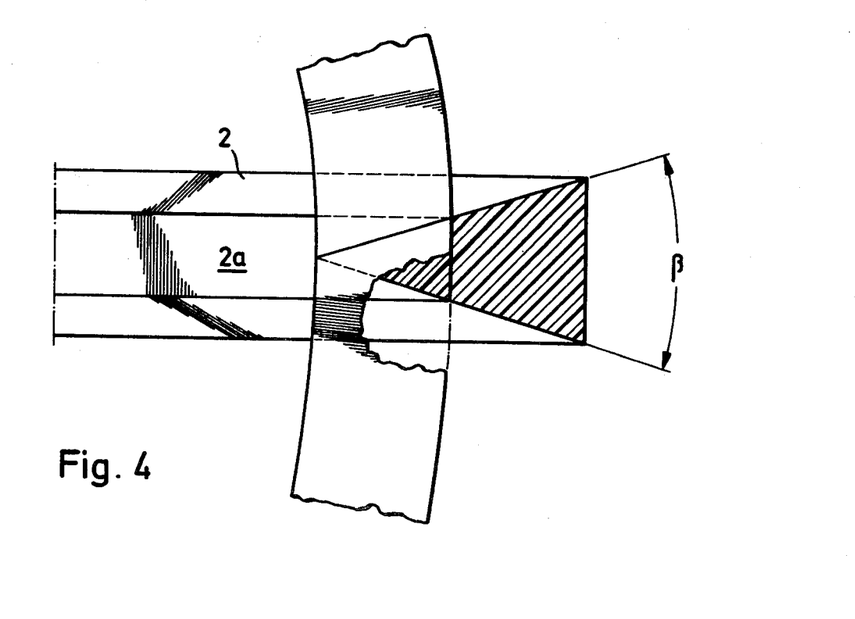
FIG. 4 is an elevational view of FIG. 3 seen in the direction of the arrow IV in FIG. 3.

In the filter body 1 shown in FIGS. 1 to 4, an imaginary separating plane extending on or into the great circular ring 2 which has a trapezoidal profile that is especially well visible in FIGS. 3 and 4 and tapers toward the inside of the sphere. The inner surface 2a of the ring 2 lies in the surface of the sphere surrounding the remaining bars 3-10 in which are placed the outer surfaces of the other bars proceeding along the large circles of the sphere. The bars rise in the form of four pairs of bars 3, 4, 5, and 6 vertically upwardly and extend in the form of four further pairs of bars 7, 8, 9, and 10 vertically downwardly (i.e., behind the drawing plane in FIG. 2). Both bars of each pair of bars extend on their point of connection toward the great circular ring 2, as seen in FIG. 3, so far beyond the separating plane that they intersect with the surface of the great circular ring 2 placed on the other side of the separating plane. The bars of each pair of bars proceed thus in the form of circular arches with a length of slightly less than a quarter of a circle, at least approximately vertically along to the great circles of the sphere on the great circular ring.

On their ends remote from the annular bar 2, the bars of each pair of bars 3 to 10 run always together to a nodal point. This nodal point lies a distance from the top of the sphere relative to the separating plane such that the opposite nodal points define a cylindrical passage 11 through the sphere free which is placed vertically on the drawing plane in FIG. 2 and has a diameter that preferably equals from a quarter to a fifth of the diameter of the sphere. The nodal points of the pairs of bars are at a distance from the neighboring nodal point which distance prevents the formation of a bridge of liquid, that is, it is greater than the length from a nodal point to the drop of the exchange liquid torn-off toward the neighboring nodal point. From the nodal point of each pair of bars extends vertically to the middle plane of the great circular ring 2 into the inside of the plane a bar 12 or finger, ending at a distance from the middle plane through the great circular ring 2 and which is large enough to prevent a liquid bridge.

According to the invention, the bars of the pairs of bars 3 to 10 have also a trapezoidal profile that tapers toward the inside of the sphere as it is best seen in FIGS. 2 and 3, in which the trapezoidal, sectional surfaces of these bars are identified by reference numeral 15.

Moreover, the nodal points of the pairs of bars are connected on one side of the great circular ring, as for example, the nodal points of the pair of bars 3 to 6 by a small ring 16 which increases substantially the solidity of the filter body, which, however, is omitted on the other side of the great circular ring for an easier removal from the mold, because of the nodal points.

It is important that the surfaces in FIG. 2 be factually vertical to the drawing plane, since, along these surfaces, the form cores, attached in both halves of the molds for diecasting the filter body, when opening the molds on the respective surfaces of the filter body, must slide vertically to the drawing plane in FIG. 2 and not extend anywhere beyond the projection of the respective bars to the drawing plane in FIG. 2.

As seen from FIGS. 1 to 3, the bars of each pair 3 to 6 lie with their surfaces turned away one from the other, always on planes standing vertically to the plane of the great circular ring to which the bars of the pairs 7 to 10 are always adjacent from the other side with their surfaces turned away from each other. In the illustrated example of embodiment, these planes are not passed through (crossed) by bars of the pairs of bars. These border always only on these planes with the exception of positions on which these bars, overlapping each other, are connected with the great circular ring 2, seen best in FIG. 3.

The mentioned planes from which one, for example, in FIG 3, is defined by the circular arc 17 is partly taken in by the surface 19, comprise advantageously the axis of the great circular ring 2. The surfaces of the bars of the pairs of bars away from these planes, i.e., the surfaces 20 and 21 (FIG. 2) of both bars of each pair of bars 3 to 10, are conical, formed so that a strip of an approximately triangular profile is removed (had to be cut off) so that these bars show thereafter a trapezoidal profile, tapering toward the inside of the sphere, or even a triangular profile.

The described filter body is equally easily removable from the mold. For the production of the heretofore described mold body (the bars 23 will be later explained) a mold, for example, can be applied having the separating plane coinciding with the center plane of the great circular ring 2. This mold has two semispherical recesses from the bottom of which a cylinder extends always in the center up to the separating plane of the mold which coincides also with the mentioned middle plane. This cylinder limits the fingers 12 from within. Moreover, from the bottom of a semispherical void in FIG. 2, in the mold part, behind the plane of the drawing, basically sphere-sector-shaped parts extend upward into the half of the mold placed above the drawing plane in FIG. 2. These parts of mold extend in FIG. 2 from below upward, always between the pairs of bars 3, 4, 5, and 6. The sphere sectors have recesses serving from forming the fingers 12. They have, furthermore, recesses along their circularly arched edges above the plane of the drawing in FIG. 1 for forming the bars of the pairs 3, 4, 5, and 6.

Analogously formed sphere-sector parts extend downward from the mold part placed in FIG. 2 above the drawing plane into the recess of the mold part placed behind the drawing plane.

The mentioned spherical, sector-shaped projections of the molds naturally leave the required space for the mentioned cylinder for forming the free central passage 11

The heretofore described filter body design is further improved in respect of leading off the liquid from the periphery into the inside of the body when bars 23 (FIGS. 1 and 2) are additionally included.

Bars 23 proceed also in FIG. 2 vertically to the drawing plane. The bars 23 of FIG. 2 rise upward from the surface of each pair of bars placed behind the drawing plane facing the observer where they end at about the same height with the fingers 12. A surface of each bar 23 lies further in one plane with the surface proceeding vertically to the drawing plane in FIG. 2 of the pair of bars carrying the bar 23. Equally extending are bars 23 of pairs of bars of those placed about in the middle between the ring 2 and the center of the sphere in FIG. 2 above the drawing plane.

Figure 5A:
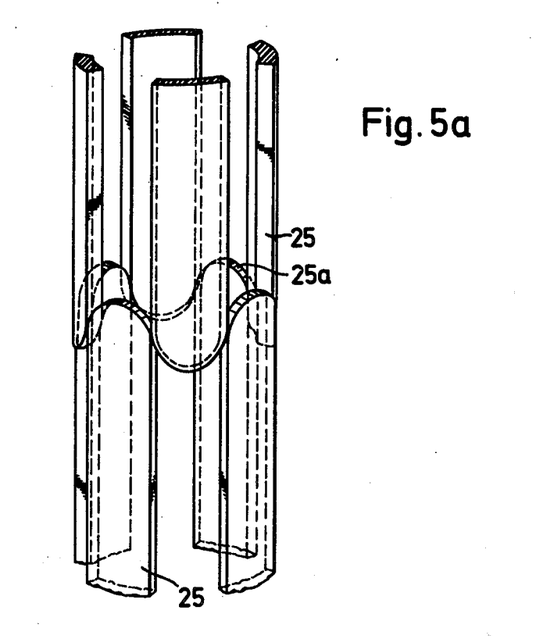
FIGS. 5a and 5b illustrate another embodiment of the bars extending from the ends of the meridian bars of the filter body according to FIGS. 1 and 2 into the inside of the sphere.
Figure 5B:
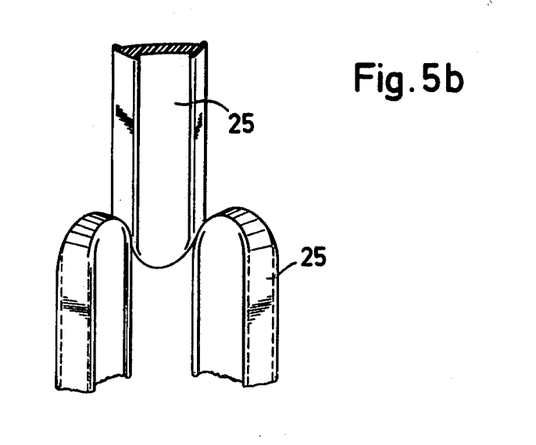

A slightly different embodiment of fingers 12 of the filter body, corresponding to FIGS. 1 to 4, is shown in FIGS. 5a and 5b. The fingers 25 shown here differ from fingers 12 basically in that they are somewhat longer and penetrate into the middle of the sphere so that their about semispherically rounded front faces 25a touch just on their edges connecting to the side edges, as best shown in FIG. 5a.

FIG. 5b shows enlarged three fingers 25. It is better recognizable in this illustration that the fingers 25 have a bent I-profile, the web of which is relatively wide and curved while the flanges are relatively thin. By the relatively thin flange, the dripping of the liquid from the fingers 25 is facilitated and the transition of the liquid to an opposite finger is rendered more difficult.

Figure 6:
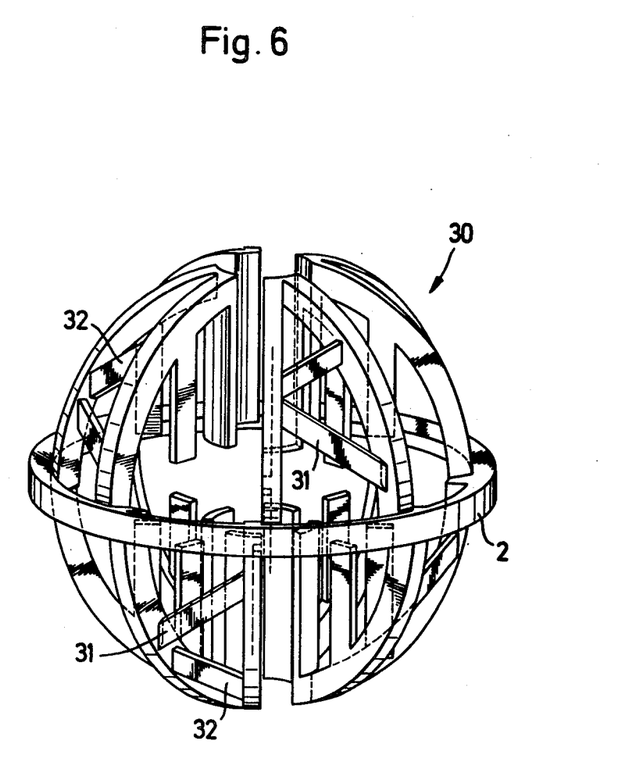
FIG. 6 is a perspective view of an additional form of embodiment having bars similar to the filter body according to FIG. 1.

The filter body 30 shown in FIG. 6 differs from the one shown in FIGS. 1 to 4 basically in that additional webs 31 and 32 are provided. These webs extend always between both bars of a pair of bars corresponding to bars 3 to 10 in FIGS. 1 and 2. The webs have a rectangular cross section and both larger and flat sides of the cross section are always vertical to the middle plane of the great circular ring 2. Easy fabrication and an easier removability from the mold during die casting of this mold body is thus secured. A further difference of the filter body 30 from the filter body 1 is also in that the filter body 30 has no connecting ring. The filter body 30 does not need such a connecting ring 16 since the solidity of the filter body is increased by the webs 31, 32. These webs improve the uniformity of the pouring and reduce the number per volume filter bodies required. Due to reasons of fabrication, the web surface, turned away from the great circular ring lies preferably in the surface of the sphere.

Many variations can be made in the shown form of embodiment. The surfaces of the pairs of bars or of the annular bar 2 directed outwardly relative to the sphere can proceed, for example, notched or ribbed (finned). The same is true for the surfaces of fingers 12 and 25 and of bars 23, projecting to the inside of the sphere within their parts proceeding in greater distances from the annular bar 2. Arcuate bars proceeding in parallel with the annular bar at a distance from the beginning and the ending of the bars of a pair can, for example, connect these. The filter body can be, for example, equally oval instead of being spherical. The curvilinearly proceeding bars can be replaced by bars composed of straight parts and also by bent bars.

The heretofore described filter bodies have advantageously an average diameter of about 2.5 to 8 cm.

Figure 7:
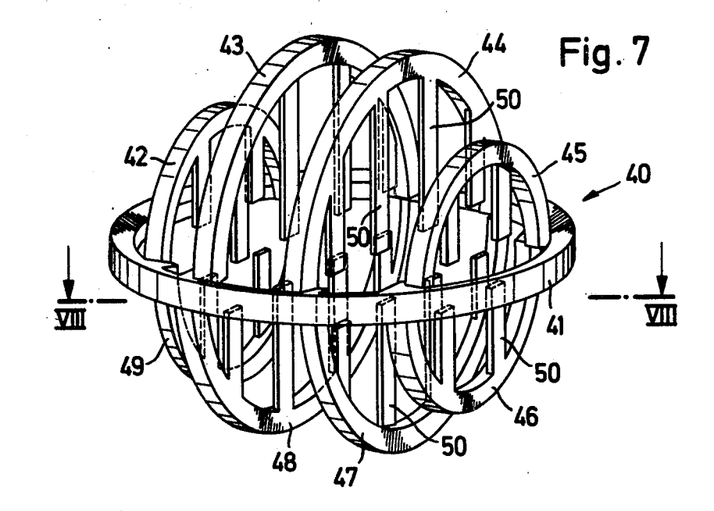
FIG. 7 is a perspective view of yet another embodiment of the invention.
Figure 8:
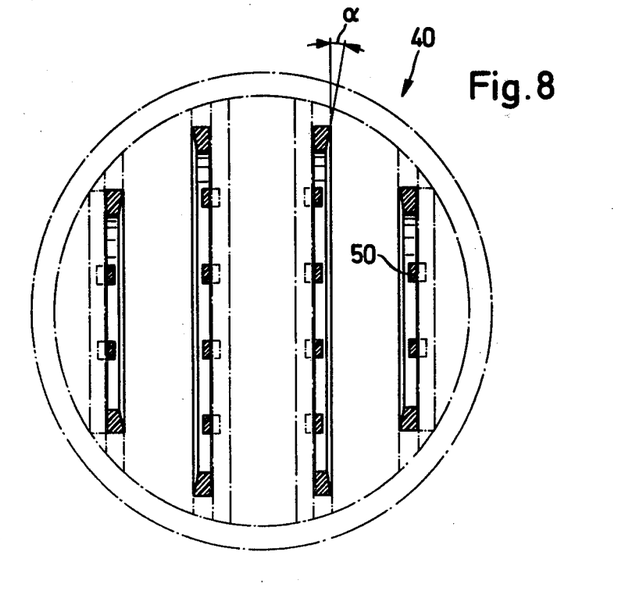
FIG. 8 is a cross-sectional view taken along section lines VIII—VIII of FIG. 7.

Another embodiment of the invention is shown in FIGS. 7 and 8. This filter body can be also larger, for example, it may be of a diameter of 10 or 12 cm. The spherical body 40 is surrounded by annular bar 41 which is adjacent from the outside to the surface of the sphere on which the remaining bars of the jacket of the filter body are adjacent. The great circular ring 41 has the same trapezoidal profile as the great circular ring 2 of the filter body 1 (FIG. 1). The bars forming the jacket of the filter body 40 are arranged semicircularly that is visible especially in FIG. 7. Thus, a plurality of semicircular bars 42 to 45 with at least one edge adjacent to the surrounding spherical surface extend above the great circular ring 41 so that bars 42 to 45 extend in mutually parallel planes at substantially equal distances from each other. A second group of semicircular bars 46 to 49 is similarly provided on the lower side.

Bars 42 and 49, bars 43 and 48, bars 44 and 47, as well as the bars 45 and 46 are of the design as seen in FIGS. 7 and 8 and extend on a plane proceeding vertically to the plane of the great circular ring 41, so that the filter body can be diecast by a tool which is analogous with the tool built for producing the filter body 1. Bars 42 to 49 also have a trapezoidal profile where the surface of two bars on a common plane extend vertically to the plane along which the actual, semicircular bar extends. The sides of the semicircular bars 42 to 49 opposite the respective surface is then equally beveled.

It is further recognizable, especially from FIG. 7, that from each one of the semicircular bars 42 to 49 several liquid leading fingers 50 extend vertically toward the plane of the great circular ring 41. The fingers end, however, at a distance from this plane. These fingers are arranged so that they are adjacent one surface to that plane to which the respective semicircular bar is also adjacent together with a second semicircular bar.

Figure 9:
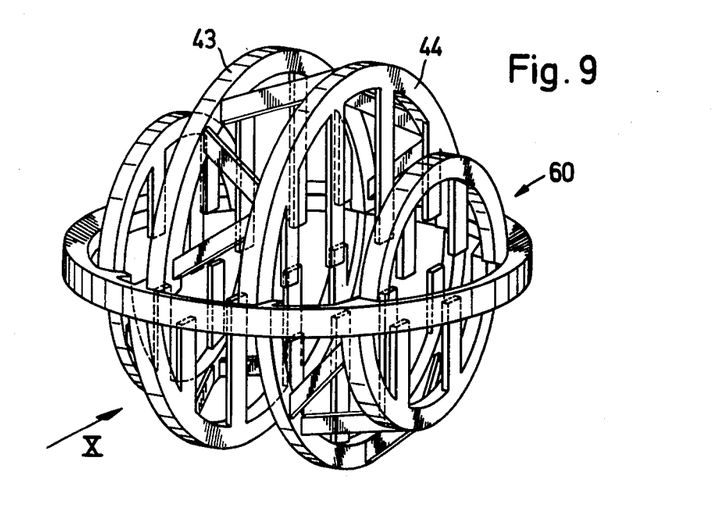
FIG. 9 is a perspective view of an additional embodiment of the filter body.
Figure 10:
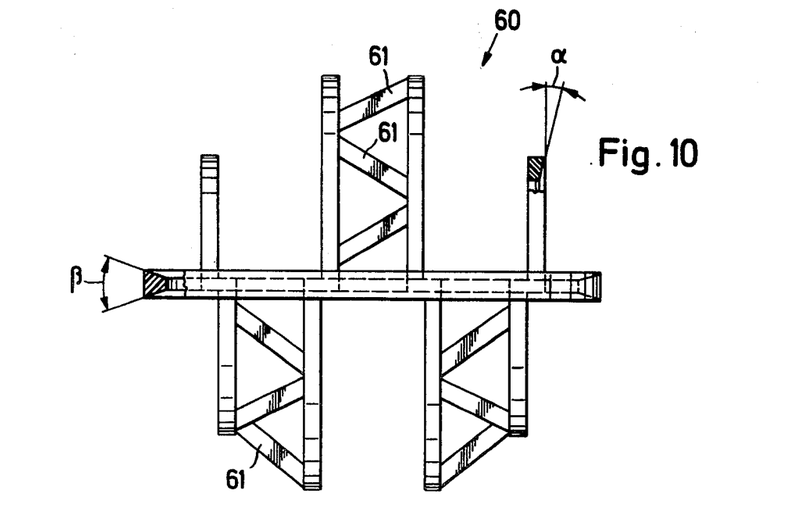
FIG. 10 is an elevational view taken in the direction of the arrow X of the filter body of FIG. 9.

The filter body 60 shown in FIGS. 9 and 10 differs from the filter body 40 in that it has additional bars or webs 61, connecting two adjacent semicircular bars For example, the semicircular bars 43 and 44. The webs 61 connect as seen in FIG. 10, adjacent semicircular bars so that these webs can be produced so that the projections of the molds can be provided in a two part mold. The webs are divided approximately in the middle of the great circular ring bar 41 in its front faces extending into the recess of the other half of the mold with respective grooves connecting the edges of the projections. The webs 61 are correspondingly formed also so that they have two opposite surfaces proceeding in parallel with the drawing plane in FIG. 10.

Experiments have shown that only in a negligible number of cases do filter bodies 60 connect into each other. It is important in the invention that the filter bodies have the correct base for wettability. In case that the liquid is basically water, especially suitable for wettability by water is plastic material such as polyethylene, polypropylene or polytetrafluorethylene. If the wettability is too slight, too little liquid is left on the bars of the bar design. If it is too strong, it runs at an excessive volume in the form of a film along the filter bodies and too few drops are formed.

It will become apparent to those skilled in the art that various modifications to the preferred embodiment can be employed but will fall within the spirit and scope of the invention as defined by the appended claims.

The embodiments of the invention in which an exclusive property or privilege is claimed are defined as follows.

1. A filter body adapted for use in a scrubber of the type including a tower within which are disposed a plurality of the filter bodies which thereby define a bed, the scrubber operating by passing a liquid downwardly through the bed while passing a gas upwardly through the bed, said filter body comprising:

a latticework jacket defined by an annular meridian ring, a plurality of arcuate bars extending upwardly and downwardly from said annular meridian ring, and a plurality of fingers extending from at least some of said arcuate bars towards a plane defined by said annular meridian ring and wherein at least a majority of said arcuate bars have a cross-sectional shape tapering inwardly towards said annular meridian ring.

2. A filter body as defined by claim 1 wherein said annular ring includes an outer surface and an inner surface, said ring tapering in cross section from said outer surface towards said inner surface.

3. A filter body as defined in claim 1 wherein each of said arcuate bars has a length of at least two to four drop-diameters of the liquid used in the scrubber and wherein the bars each include an end joined to said ring and an end remote from said ring, said remote ends of said bars being spaced from adjacent remote ends of adjacent bars a distance greater than the length of a drop of the liquid tearing off the remote end of the bar.

4. A filter body as defined by claim 2 wherein each of said arcuate bars extends in a plane which is orthogonal to the plane defined by said annular ring.

5. A filter body as defined by claim 4 wherein each of said arcuate bars has a length of at least two to four drop-diameters of the liquid used in the scrubber and wherein the bars each include an end joined to said ring and an end remote from said ring, said remote ends of said bars being spaced from adjacent remote ends of adjacent bars a distance greater than the length of a drop of the liquid tearing off the remote end of the bar.

6. A filter body as defined in claim 4 wherein each of said arcuate bars extend from the plane of said ring in the form of circular arches whereby said ring divides said jacket into an upper hemisphere and a lower hemisphere and wherein adjacent pairs of said bars are coupled to one another.

7. A filter body as defined in claim 6 wherein each of said arcuate bars has a length of at least two to four drop-diameters of the liquid used in the scrubber and wherein the bars each include an end joined to said ring and an end remote from said ring, said remote ends of said bars being spaced from adjacent remote ends of adjacent bars a distance greater than the length of a drop of the liquid tearing off the remote end of the bar.

8. A filter body as defined by claim 1 wherein each of said fingers extend perpendicular to the plane defined by said annular ring.

9. A filter body as defined by claim 8 wherein each of said arcuate bars has a length of at least two to four drop-diameters of the liquid used in the scrubber and wherein the bars each include an end joined to said ring and an end remote from said ring, said remote ends of said bars being spaced from adjacent remote ends of adjacent bars a distance greater than the length of a drop of the liquid tearing off the remote end of the bar.

10. A filter body as defined by claim 8 wherein each of said fingers extend perpendicular to the plane of said annular ring.

11. A filter body as defined by claim 10 wherein each of said arcuate bars has a length of at least two to four drop-diameters of the liquid used in the scrubber and wherein the bars each include an end joined to said ring and an end remote from said ring, said remote ends of said bars being spaced from adjacent remote ends of adjacent bars a distance greater than the length of a drop of the liquid tearing off the remote end of the bar.

12. A filter body as defined by claim 1 wherein each of said arcuate bars has a length of at least two to four drop-diameters of the liquid used in the scrubber and wherein the bars each include an end joined to said ring and an end remote from said ring, said remote ends of said bars being spaced from adjacent remote ends of adjacent bars a distance greater than the length of a drop of the liquid tearing off the remote end of the bar.

13. A filter body as defined by claim 11 wherein said bars extend from said ring in parallel to each other in an arc of a circle extending orthogonally to said ring in planes parallel to each other.

14. A filter body as defined by claim 13 wherein at least some adjacent bars are connected by a web.

15. A filter body as defined by claim 14 wherein said web has a cross section tapered inwardly toward the inside of said body.

16. A filter body as defined by claim 1 wherein said bars extend from said ring in parallel to each other and in an arc of a circle extending orthogonally to said ring in planes parallel to each other.

17. A filter body as defined in claim 1 wherein at least some adjacent bars are connected by a web.

18. A filter body as defined by claim 9 wherein said web has a cross section tapered inwardly toward the inside of said body.

* * * * *

UNITED STATES PATENT AND TRADEMARK OFFICE
CERTIFICATE OF CORRECTION

PATENT NO. : 4,203,935
DATED : May 20, 1980
INVENTOR(S) : Ernst Hackenjos

It is certified that error appears in the above-identified patent and that said Letters Patent are hereby corrected as shown below:

Column 2, line 26:

"surfaces" should be --surface--

Column 2, line 52

After "surface," insert --and--

Column 3, line 45

"extending" should be --extends--

Column 5, line 20

After "11", insert --.--

Column 6, line 57

"bars. For" should be --bars, for--

UNITED STATES PATENT AND TRADEMARK OFFICE
CERTIFICATE OF CORRECTION

PATENT NO. : 4,203,935
DATED : May 20, 1980
INVENTOR(S) : Ernst Hackenjos

It is certified that error appears in the above-identified patent and that said Letters Patent are hereby corrected as shown below:

Column 8, line 34:

"1" should be --2--

Column 8, line 57

"9" should be --1--

Signed and Sealed this

Twenty-eighth Day of October 1980

[SEAL]

Attest:

SIDNEY A. DIAMOND

Attesting Officer

Commissioner of Patents and Trademarks